(12) United States Patent
Prinz et al.

(10) Patent No.: US 7,811,714 B2
(45) Date of Patent: Oct. 12, 2010

(54) SOLID-STATE DIRECT METHANOL THIN FILM FUEL CELL

(75) Inventors: Friedrich B. Prinz, Woodside, CA (US); Turgut M. Gür, Palo Alto, CA (US); Joon Hyung Shim, Cupertino, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 927 days.

(21) Appl. No.: 11/412,401

(22) Filed: Apr. 26, 2006

(65) Prior Publication Data

US 2006/0251950 A1 Nov. 9, 2006

Related U.S. Application Data

(60) Provisional application No. 60/678,585, filed on May 4, 2005.

(51) Int. Cl.
*H01M 2/34* (2006.01)
*H01M 4/36* (2006.01)
*H01M 4/92* (2006.01)

(52) U.S. Cl. ............. 429/452; 429/484; 429/495; 429/524; 429/525

(58) Field of Classification Search ............. 429/30, 429/452, 465, 482, 484, 485, 495, 524–525, 429/529
See application file for complete search history.

(56) References Cited

U.S. PATENT DOCUMENTS

| | | | |
|---|---|---|---|
| 6,183,894 B1 * | 2/2001 | Adzic et al. | 429/13 |
| 6,524,736 B1 * | 2/2003 | Sompalli et al. | 429/42 |
| 2003/0228508 A1 * | 12/2003 | Champion et al. | 429/30 |
| 2006/0063046 A1 * | 3/2006 | Hu et al. | 429/17 |

* cited by examiner

*Primary Examiner*—Raymond Alejandro
(74) *Attorney, Agent, or Firm*—Lumen Patent Firm

(57) ABSTRACT

A direct methanol fuel cell is described. The DMFC uses a solid electrolyte that prevents methanol crossover. Optional chemical barriers may be employed to prevent $CO_2$ contamination of the electrolyte.

14 Claims, 8 Drawing Sheets

SOLID-STATE DIRECT METHANOL THIN FILM FUEL CELL

RELATED APPLICATIONS

This application claims priority under 35 U.S.C. §119(e) to provisional application No. 60/678,585 filed on May 4, 2005 titled "Solid-State Thin Film Fuel Cell."

BACKGROUND

The rapid proliferation of portable electronics such as cell phones into the consumer marketplace has placed an urgent need for high energy density, reliable, and inexpensive energy generation and storage systems suitable for such device applications. Among the competing technologies under development for the portable market segment, direct methanol fuel cells (DMFC's) seem to have the biggest edge due to their high energy density and storage capability, simplicity of operation and maintenance, small size, and cheep and ready availability of methanol fuel. Direct methanol fuel cells offer five times the energy density of lithium ion batteries. Methanol is a cheap and widely available fuel with an extremely high volumetric energy density of 18,000 MJ (LHV)/m$^3$, compared to only 10.9 MJ (LHV)/m$^3$ for hydrogen. Furthermore, methanol's capability for easy delivery and instant charging as well as its safety are very desirable features for consumer acceptability.

However, this technology is not without problems. One of the most serious is the fact that polymer exchange membranes (PEM's) made from polyperfluorosulfonic acid (also known as perfluorinated membranes, which are available as Nafion membrane by DuPont, USA) that are commonly employed in DMFC's pose severe limitations in cost, chemical stability, water management, and chemical shorting due to transport of unreacted methanol through the membrane (termed "methanol crossover") from the anode compartment to the cathode compartment where it is oxidized to produce CO2. This "chemical short circuit" causes a significant reduction in fuel utilization, adversely affects the cathodic reduction of oxygen, and polarizes the cathode resulting in increased cathodic overpotential. The two competing reactions of methanol oxidation and oxygen reduction give rise to mixed potential at the cathode and lower the open circuit voltage of the cell. This situation is exacerbated by dilution of the methanol fuel to 3-10% (about 1 to 3 M Methanol) in water to minimize crossover. All of these factors naturally have an adverse impact on cell efficiency. Another noteworthy problem with DMFC is the need for highly active and stable anode catalyst for the sustained direct oxidation of methanol.

Methanol also gives rise to chemical degradation of the membrane by corrosion. Hence, low concentration (typically 3-15 wt. % methanol in water) methanol solutions are employed in order to mitigate the effects of methanol crossover and membrane degradation problems. However, such dilution of the methanol fuel further lowers the cell potential, and reduces conversion efficiency. Employing high methanol concentrations is not an effective solution either, because methanol crossover due to electro-osmotic drag of protons then becomes significant at high concentrations.

Furthermore, to acquire sufficient proton conductivity, perfluorinated membranes require the presence of water to maintain at high hydration level. Even though water is one of the reaction products of methanol oxidation, it is not trivial to maintain the membrane properly soaked in water. Hence, water management is also an issue with practical consequences in these cells.

Low activity of anode catalyst for methanol oxidation is another concern. The theoretical value of the open circuit potential for methanol oxidation to $CO_2$ and $H_2O$ is 1.2 V. Unfortunately, methanol oxidation proceeds slowly on the Pt anode because it is inhibited by the strongly adsorbed CO and other $C_1$-intermediates, which block catalytically active surface sites. Surface kinetics are somewhat improved by using bimetallic catalysts such as PtRu, or even trimetallic systems, with the addition of Sn, W, Mo etc. But the cost of noble metal catalysts and anode fabrication are still high.

OBJECTS AND ADVANTAGES

The present invention has many advantages over prior art fuel cells. For example:
1. Reduced ohmic losses due to thin film structure;
2. Lowered operating temperature of the system due to reduction of ohmic resistance;
3. Ability to operate over a wide temperature window (RT to 500° C.);
4. No need to dilute with water (recycle water from cathode to anode);
5. Minimal resistive losses;
6. Fuel flexibility and tolerance;
7. Rich choice of zeolites for catalytic electrode materials;
8. Effective doping and decoration strategies to enhance catalytic activity of the anode; and
9. High volumetric power density.

In comparison with conventional DMFC's, the present invention has
   Significantly less dilution of methanol with water (50 mol % methanol);
   Potentially direct oxidation of methanol without mixing with water;
   No methanol crossover;
   No spurious reactions at the cathode;
   Higher catalytic activity for methanol oxidation;
   Higher efficiency and fuel utilization; and
   No need for precious metal electrodes.

In comparison with conventional PEMFC's, the present invention has
   No need for water management;
   No need for water retention in the electrolyte to maintain conductivity;
   No need for humidification of hydrogen fuel; and
   Tolerance to CO, $CO_2$ and sulfur in hydrogen fuel.

SUMMARY

This document described a solid state design allows the use of highly concentrated methanol or other liquid fuels, resulting in higher open circuit potential and higher conversion efficiency. In the absence of methanol crossover, cathode kinetics is restored, no water management inside the cell is necessary, and cathode kinetics is restored so spurious reactions due to crossover that affect cathodic polarization and oxygen reduction are entirely eliminated.

DESCRIPTION

Figure 1:
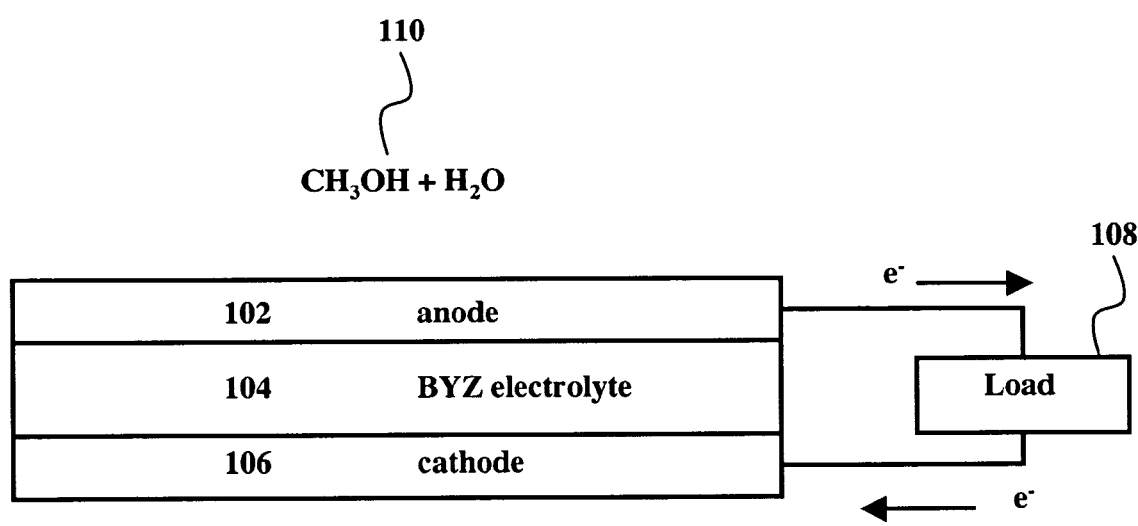
FIG. 1 shows an example of a thin film fuel cell with a BYZ electrolyte.

The present invention provides a thin film all solid-state fuel cell that addresses the shortcomings of conventional DMFCs. The solid-state fuel cell completely eliminates methanol crossover and its associated problems, and significantly improves the methanol oxidation kinetics by optionally employing a chemically modified zeolite-based anode catalyst that is doped and/or decorated with catalytically superior moieties.

One embodiment of an architecture of the solid-state fuel cell is composed primarily of thin films of a catalytic anode employing a zeolite, an anhydrous proton conducting solid electrolyte, a suitable cathode, and current collectors, if necessary, stacked up to make a versatile fuel cell that can handle and utilize a wide variety of fuels.

According to an exemplary embodiment of the invention, a thin film all-solid-state fuel cell device employs an anhydrous proton conducting solid electrolyte that has a thickness of 20-100 nm with a doped and/or decorated zeolite or zeolite-like nanoporous catalytic thin film anode, an anode current collector that also serves as a chemical barrier layer, and a thin film oxygen cathode. In some embodiments, the total thickness of the fuel cell structure is less than 1000 nm.

Zeolites are crystalline aluminosilicates of the general formula $M_{x} \cdot (Si_{1+x}Al_x)O_2 \cdot nH_2O$ that have well defined nanosize pores with diameters up to 1.3 nm. The hydrogen form of zeolites is often employed as acid catalysts in petroleum and chemical industries for important hydrocarbon reactions.

Alternatively, alkali metal forms of zeolites are of basic character, and also useful in selective catalysis. The present invention employs both acidic and basic zeolites.

The pores of the zeolite framework are made of 10-18 member oxygen rings. The substitution of Al for Si in the framework structure is compensated by hydrogen atoms that are localized at the zeolite oxygen sites (i.e., acid sites) which act as active sites for adsorption and chemisorption of hydrocarbons. Further doping of the zeolite structure by ion exchange either in the liquid or solid state allows incorporation of transition metal ions into the zeolite structure and enhances its catalytic and electrical properties. Additional enhancement can be obtained by chemically decorating the inner surfaces of the pore with nanocrystallites of hydrogenation catalysts such as Pt, Pd, $TiO_2$, etc.

The mechanism involves a sequence of steps including the adsorption and chemisorption of the hydrocarbon fuel (such as methanol) in the zeolite pore, deprotonation of the fuel, breaking up of C—H bonds, diffusion of the protons (or hydronium ion) to the triple phase boundary, incorporation into the proton conducting solid electrolyte and migrating to the cathode, and finally picking up electrons from the cathode and reacting with the oxygen to make water vapor. The electrons that are stripped from the hydrocarbon fuel at the anode travel in the external circuit towards the cathode while doing electrical work. Depending upon materials selection, the anode current collector may serve at the same time as a chemical barrier layer for keeping out $CO_2$ from reaching the triple phase boundary, and also as a selective membrane for protons that promotes the hydrogen incorporation reaction into the electrolyte.

It is generally agreed that the proton incorporation reaction into the solid electrolyte involves the reaction:

$$H_2O_{(g)} + V_O^{**} + O_O^x = 2OH_O^* \qquad (1)$$

$OH^-$ from the dissociation of water fills and oxygen vacancy while the $H^+$ forms a covalent bond to the lattice oxygen. The result is 2 $OH^-$ on the oxygen sublattice.

Alternatively, protons may replace oxygen vacancies as charge compensators for the acceptor dopant, and form interstitial hydrogen which are actually associated with oxygen ions to form 2 $OH^-$ groups. The corresponding reaction is:

$$H_2O_{(g)} + V_O^{**} = O_O^x + 2H_i^* \qquad (2)$$

These two reactions are structurally equivalent to each other.

The fabrication of the solid-state DMFC involves advanced materials processing and thin film synthesis techniques, including, but not limited to, pulsed laser deposition (PLD), atomic layer deposition (ALD), sputtering, lithography, wet chemistry, self-assembly, Langmuir-Blodgett, etc.

Optionally, the cathode is selected from a group of metallic or mixed ionic electronic conducting materials including Pt, NiOOH, doped perovskites of the general formula $AA'BB'O_3$ or $AA'A''BB'B''O_3$ (where A' and A'' are cation dopants on the A site of the perovskite structure, while B' and B'' are cation dopants on the B site), the anhydrous proton conducting solid electrolyte is a doped persovskite of the Y-doped $BaZrO_3$ family, the anode catalyst is a doped or decorated zeolite as discussed above, and the current collector and barrier layer is made of a thin film comprising of Pt, Pd, $RuO_2$, metal hydrides such or $LaNi_5H_6$, and mixed conducting bronzes such as $H_xWO_3$.

This disclosure describes a thin film all solid-state fuel cell that aims to address the shortcomings of conventional DMFC's. One embodiment of the solid-state fuel cell employs a thin film of a hydrogen ion conducting solid electrolyte and a chemical barrier anode that provides added chemical stability to the electrolyte. The hydrogen ions move through the thin electrolyte film by lattice diffusion, thus completely eliminating methanol crossover and its associated problems. This fuel cell significantly improves the methanol oxidation kinetics by employing a catalytically active nanostructured anode film that also serves as a chemical barrier layer.

This all-solid-state thin film DMFC promises major improvements in device performance and completely eliminates methanol crossover and its associated problems. This is accomplished by employing thin film proton conducting solid electrolytes such as hydronium β-alumina and hydronium β'-alumina and yttria-doped barium zirconate ($Y_2O_3$—$BaZrO_3$:BYZ).

Doped perovskites such as $BaCeO_3$, $BaZrO_3$, and $SrCeO_3$ with yttrium or gadolinium doping have also been known to conduct protons. Among these, BYZ exhibit sufficient chemical stability combined with high proton conductivity at low temperatures. Introduction of aliovalent dopants into the host oxide leads to formation of oxide vacancies to preserve overall charge neutrality. In wet environments, gaseous water dissociates on the solid surface into a hydroxide ion and a proton. The hydroxide ion occupies the vacancy site while the proton covalently bonds to lattice oxygen. In Kroger-Vink notation, proton incorporation reaction into the BYZ is given as equation (1), above, where in effect, two positively charged protonic defects substitute for the oxide site". The protonic defects in BYZ are highly mobile and this accounts for high ionic conductivity. BYZ possesses the cubic perovskite structure with a large lattice constant of 0.42 nm. This high symmetry is important for attaining a high solubility and high isotropic mobility for the protonic defects.

Since $BaZrO_3$ has limited stability under high $CO_2$ partial pressures, we need to shield it from direct exposure to $CO_2$ in the gaseous anode environment. This can be achieved via an ultra thin layer of a chemical barrier layer such as Pd or a Pd alloy. The reason for this choice is manifold. For one, Pd and a number of its alloys are electronically as well as protonically conductive, i.e., they are mixed electronic-protonic conductors. Keeping this protective layer at a thickness of only a few nanometers should assure little resistance to proton conduction into the electrolyte.

Both β- and β"-alumina compounds have layered structures where the Al—O blocks are separated by two dimensional conduction planes containing the mobile hydronium ions. These materials are stable up to about 150° C. before dehydration starts. So they are suitable for operating in the temperature regime of DMFC's which is normally below 100° C. Furthermore, room temperature conductivities of hydronium β- and β'-aluminas range between $10^{-3}$ and $10^{-5}$ $S/cm^2$. These high proton conductivity values are attractive for DMFC's. However, protonic conductivity in these structures is much dependent on the crystal orientation of the conduction planes as well as the extent of the proton exchange reaction. Hence, the key issues will be materials anisotropy and stability especially at the submicron membrane thickness.

One example of an architecture of the solid-state fuel cell is illustrated in FIG. 1. It consists primarily of thin films of a catalytic anode, an anhydrous proton conducting solid electrolyte, a suitable cathode, and current collectors, if necessary, stacked up to make a versatile fuel cell that can handle and utilize a wide variety of fuels. The catalytic anode itself or the anode current collector may serve also as a chemical barrier layer to eliminate possibility of electrolyte degradation. Specifically, the barrier layer can protect the electrolyte film from reacting with $CO_2$ which results from the anodic oxidation of methanol.

Figure 2:
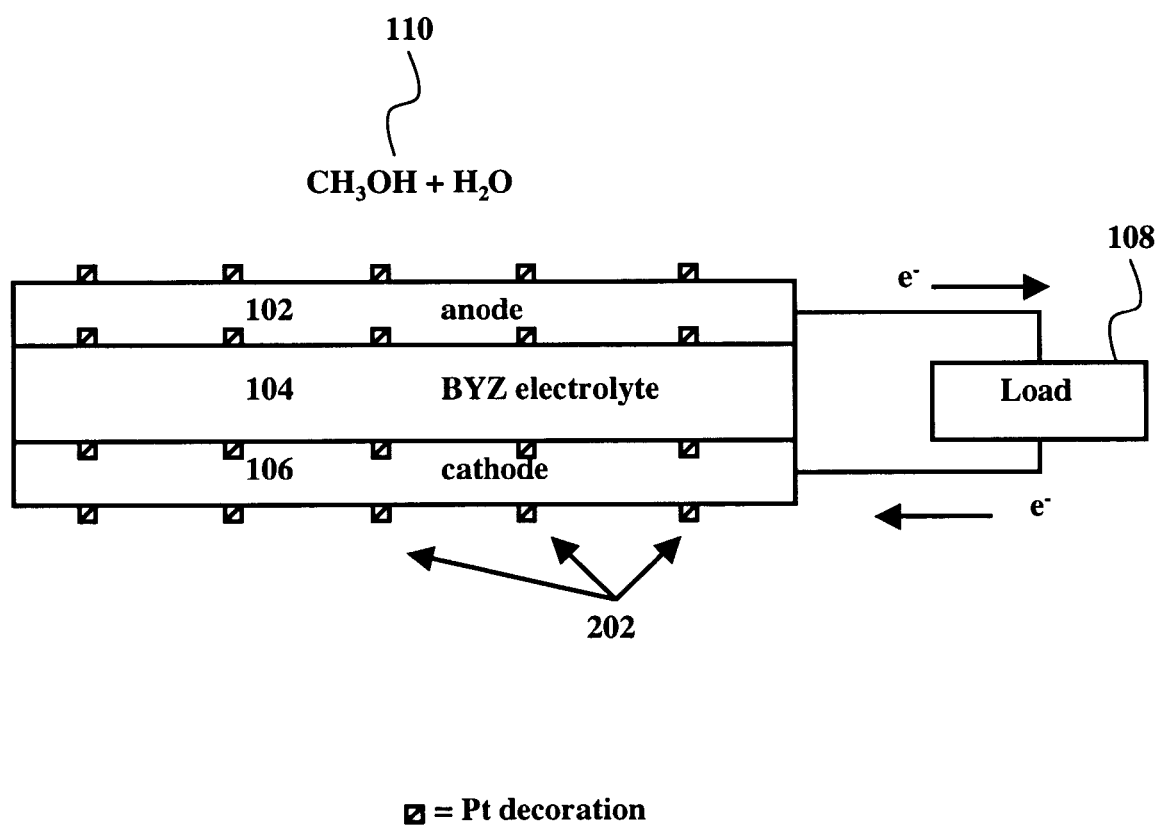
FIG. 2 shows an example of a thin film fuel cell with a BYZ electrolyte decorated with Pt.
Figure 3:
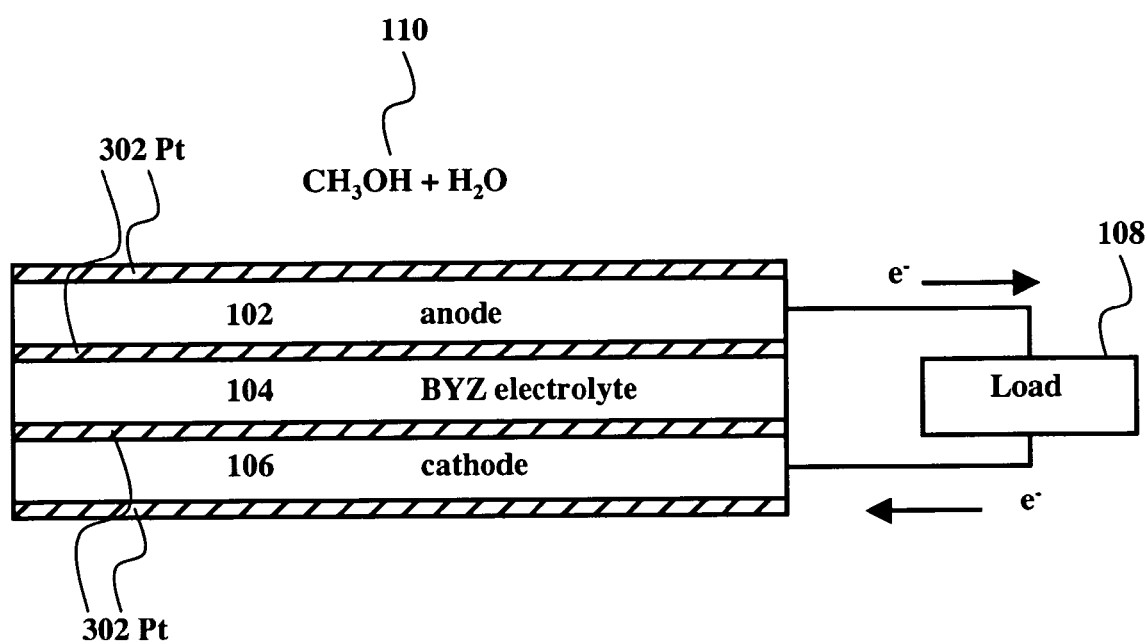
FIG. 3 shows an example of a thin film fuel cell with a BYZ electrolyte with Pt layers.

An undercoat or overcoat of Pt catalyst either in the form of a thin contiguous film of 1-50 nm thick, or as islands of Pt decorating the anode and cathode surfaces, or alternatively, at the electrode/electrolyte interfaces in order to enhance the catalytic rates of the individual electrode reactions at the anode and cathode. A fully decorated cell structure is shown in FIG. 2, while FIG. 3 depicts one with contiguous Pt catalytic films. Depending upon need, all or some of the interfaces and surfaces may be coated.

A thin film all-solid-state fuel cell device may employ a proton conducting solid electrolyte thin film that has a thickness of 20-100 nm with a doped nanoporous catalytic thin film barrier anode, an anode current collector that may also serve as a chemical barrier layer, and a thin film oxygen cathode. The total thickness of the fuel cell structure may be less than 1000 nm.

In one embodiment, the cathode may be selected from a group of metallic or mixed ionic electronic conducting materials including Pt, NiOOH, doped perovskites of the general formula $AA'BB'O_3$ and $AA'A''BB'B''O_3$, or, for example, La—Sr—Co—Fe—O, Ba—Sr—Co—Fe—O and La—Sr—Cu—O perovskites; the proton conducting solid electrolyte film can be hydronium β-alumina, β"-alumina, or a doped persovskite of the Y-doped $BaZrO_3$ family; the anode catalyst can be Pt, Pd or their alloys, or at the same time a mixed conducting chemical barrier for $CO_2$ having sufficient hydrogen ion and electronic conductivities such as the oxides of the valve metals W, Mo, V, Ta, Nb, Ti, and Cr, or the oxides of precious metals Ru, Re, Os, Ir, Rh, or metal hydrides such as Pd and $LaNi_5$; and the current collector and barrier layer may be made of a thin film comprising of Pt, Pd, and their alloys, $RuO_2$, metal hydrides such or $LaNi_5H_6$, and mixed conducting bronzes such as $H_xWO_3$.

The mechanism involves a sequence of steps including the adsorption and chemisorption of the hydrocarbon fuel (such as methanol) on the nanostructured anode, deprotonation of the fuel, breaking up of C—H bonds, diffusion of the protons (or hydronium ion) to the triple phase boundary, incorporation into the proton conducting solid electrolyte and migrating to the cathode, and finally picking up electrons from the cathode and reacting with the oxygen to make water vapor. The electrons that are stripped from the hydrocarbon fuel at the anode travel in the external circuit towards the cathode while doing electrical work. Depending upon materials selection, the anode current collector may serve at the same time as a chemical barrier layer for keeping out $CO_2$ from reaching the triple phase boundary, and also as a selective membrane for protons that promotes the hydrogen incorporation reaction into the electrolyte.

The fabrication of the solid-state DMFC involve advanced materials processing and thin film synthesis techniques, including, but not limited to, pulsed laser deposition (PLD), atomic layer deposition (ALD), sputtering, lithography, wet chemistry, self-assembly, LangmuirBlodgett, etc.

FIG. 1 shows an example of a thin film fuel cell with a BYZ electrolyte. Shown are an anode 102, a BYZ electrolyte 104, a cathode 106, a load 108 that uses power generated by the fuel cell, and fuel 110. The example of fuel 110 shown is methanol. Other liquid fuels such as ethanol, natural gas, gasoline, or diesel fuel can also be used. For the purposes of this application, when methanol is mentioned as a fuel, it is implied that other hydrocarbon based fuels are also usable.

FIG. 2 shows an example of a thin film fuel cell with a BYZ electrolyte decorated with Pt. Shown are an anode 102, a BYZ electrolyte 104, a cathode 106, a load 108, and fuel 110. Also shown are decorations of Pt 202. Pt decoration 202 may be on one or both sides of the anode 102 and/or the cathode 106.

FIG. 3 shows an example of a thin film fuel cell with a BYZ electrolyte with Pt layers. Shown are an anode 102, a BYZ electrolyte 104, a cathode 106, a load 108, and fuel 110. Also shown are layers of Pt 302. Pt layers 302 may be on one or both sides of the anode 102 and/or the cathode 106.

Figure 4:
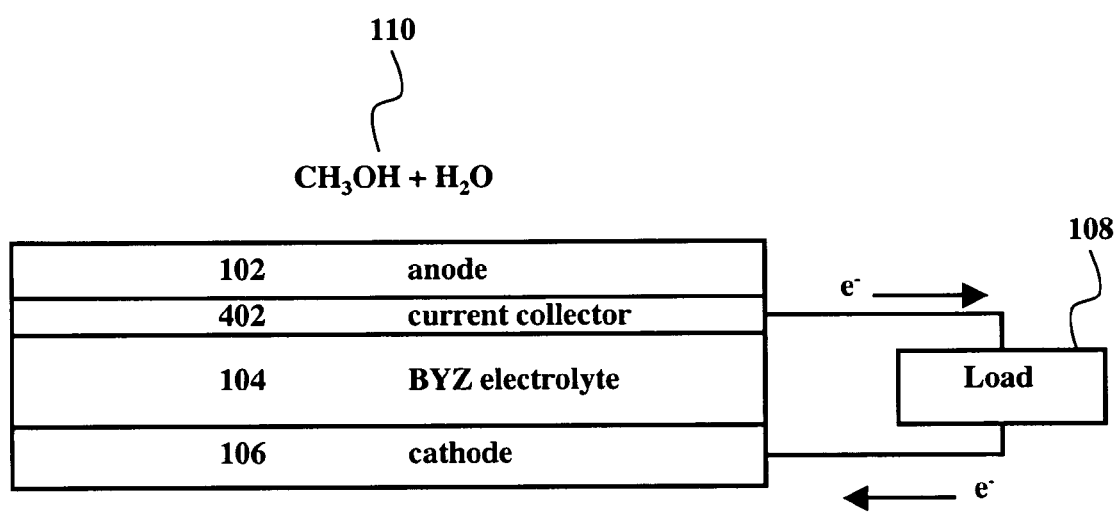
FIG. 4 shows an example of a thin film fuel cell with a BYZ electrolyte and a current collection layer.

FIG. 4 shows an example of a thin film fuel cell with a BYZ electrolyte and a current collection layer. Shown are an anode 102, a BYZ electrolyte 104, a cathode 106, a load 108, fuel 110, and current collector 402. While the current collector 402 is shown in between the anode 102 and the electrolyte 104, the current collector 402 may optionally be placed in between the anode 102 and the fuel 110.

Figure 5:
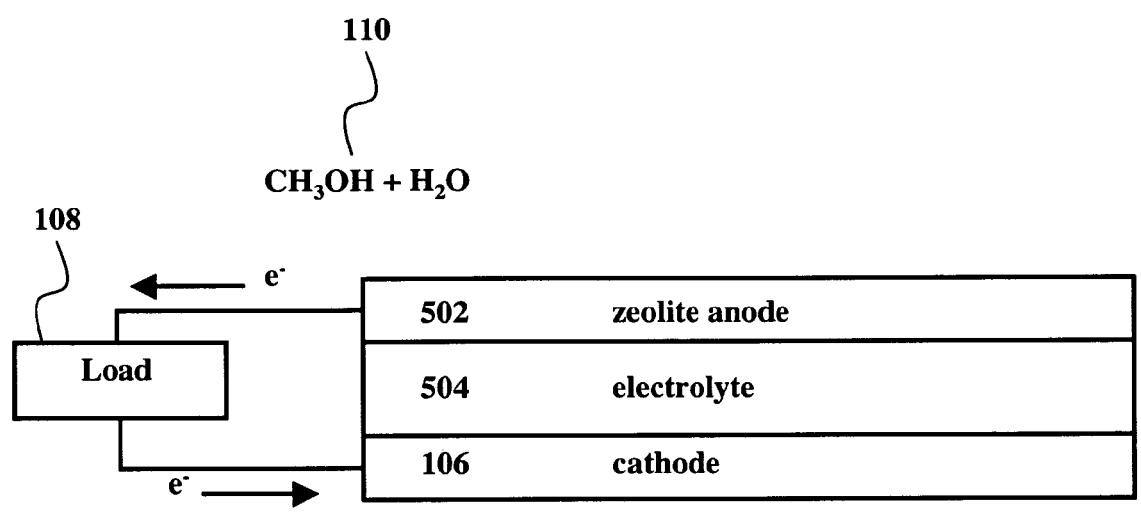
FIG. 5 shows an example of a thin film fuel cell with a zeolite anode.

FIG. 5 shows an example of a thin film fuel cell with a zeolite anode. Shown are a zeolite anode 502, a electrolyte 504, a cathode 106, a load 108, and fuel 110.

Figure 6:
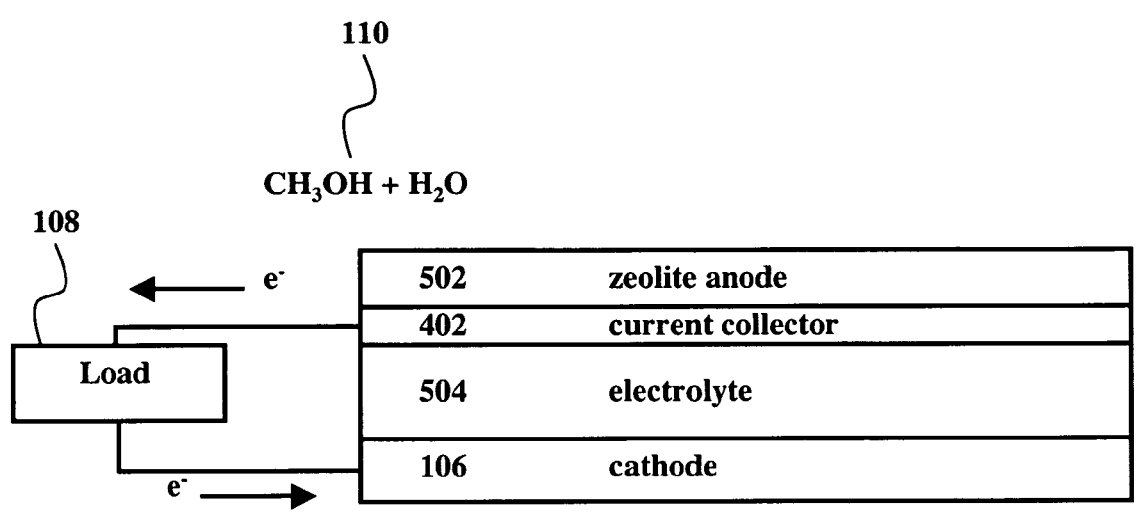
FIG. 6 shows an example of a thin film fuel cell with a zeolite anode and a current collection layer.

FIG. 6 shows an example of a thin film fuel cell with a zeolite anode and a current collection layer. Shown are a zeolite anode 502, a current collector 402, a electrolyte 504, a cathode 106, a load 108, and fuel 110. The current collector 402 may optionally be placed in between the anode 502 and the fuel 110.

Figure 7:
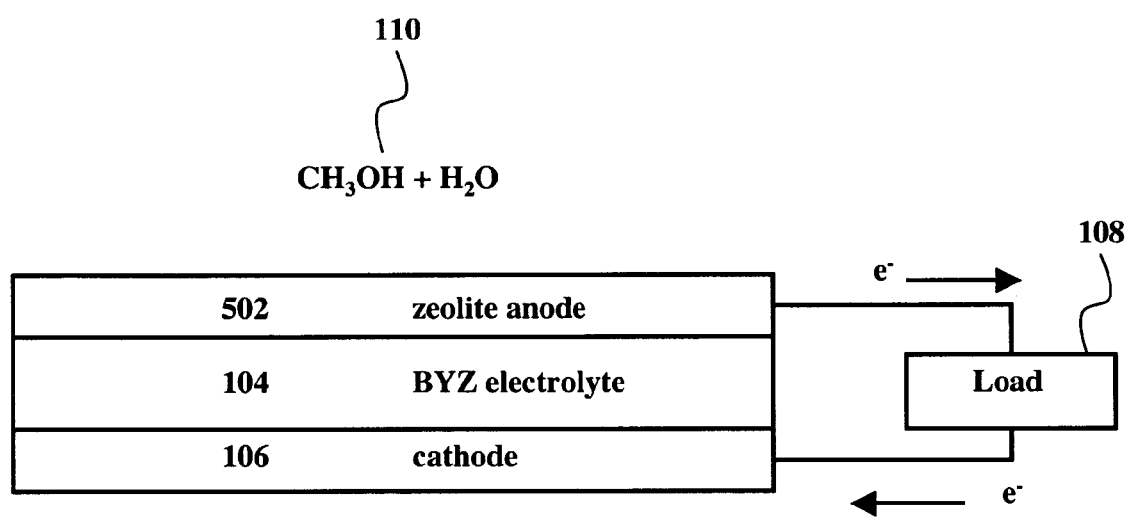
FIG. 7 shows an example of a thin film fuel cell with a BYZ electrolyte and a zeolite anode.

FIG. 7 shows an example of a thin film fuel cell with a BYZ electrolyte and a zeolite anode. Shown are a zeolite anode 502, a BYZ electrolyte 104, a cathode 106, a load 108, and fuel 110.

Figure 8:
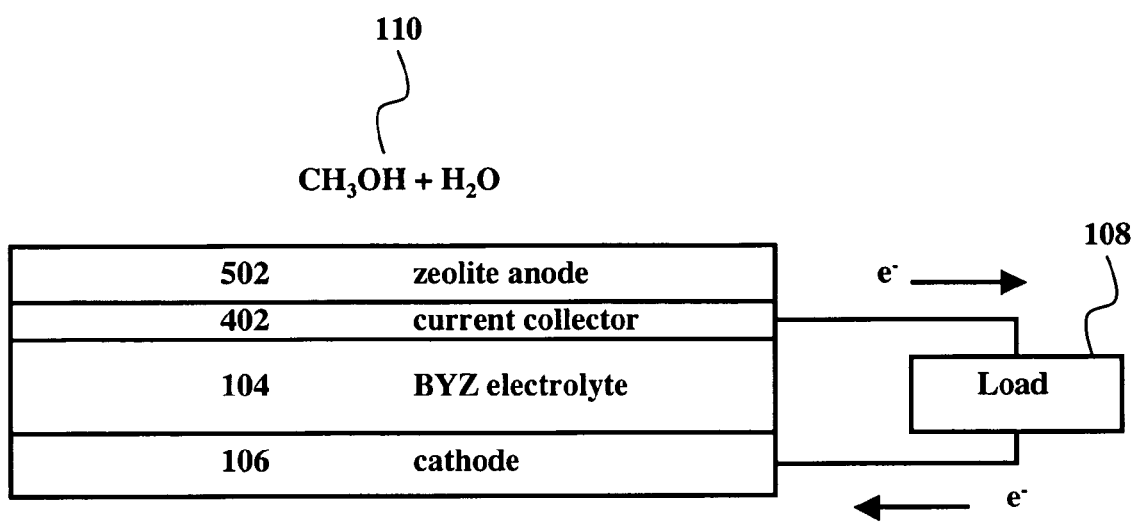
FIG. 8 shows an example of a thin film fuel cell with a BYZ electrolyte, a zeolite anode, and a current collection layer.

FIG. 8 shows an example of a thin film fuel cell with a BYZ electrolyte, a zeolite anode, and a current collection layer. Shown are a zeolite anode 502, a current collector 402, a BYZ electrolyte 104, a cathode 106, a load 108, and fuel 110. The current collector 402 may optionally be placed in between the anode 502 and the fuel 110.

The term "decoration" in this application is used to mean a sprinkling of one material on the surface of another material. For example, a Pd anode that is decorated with Pt may have nanoscale clusters of Pt on the Pd anode surface such that the Pt particles form islands rather than covering the entire Pd anode surface as a contiguous film. An interface may also be decorated. For example, the interface between an anode and an electrolyte may be decorated with Pt.

As one of ordinary skill in the art will appreciate, the drawings, tables, and description disclosed herein illustrate technologies related to the invention, show examples of the invention, and provide examples of using the invention. Various changes, substitutions, modifications, and alterations could be made or otherwise implemented without departing from the principles of the present invention. Possible variations may include other anhydrous proton conducting solids such as perovskites, layered oxides like hydronium β- and β"-aluminas, hydrated solid proton conductors like clays, heteropoly acids, and hydrous oxides. Moreover, other zeolite-like structures, mica, alumina silicates, mixed proton-conducting hydrides or oxyhydrides may be employed for catalytic anode. Accordingly, the present invention should not be construed as being limited to or defined by what is shown or described herein.

What is claimed is:

1. A direct methanol fuel cell comprising: stacked layers of
    a. an anode, the anode comprising a mixed-electronic-proton conducting anode material exposed to a hydrogen-containing fuel source the anode comprising Pd or a Pd alloy;
    b. a nonporous proton conducting solid Y-doped BaZrO3 electrolyte, wherein the Y-doped BaZrO3 electrolyte provides oxygen vacancies disposed to transport protons through the crystal lattice of the electrolyte; and
    c. a cathode exposed to an oxygen-containing source, wherein the anode surface faces away from the electrolyte and the cathode surface faces away from the electrolyte and each surface of the electrolyte comprises Pt islands, wherein said Pt islands are spaced apart from one another, wherein each of the Pt island has a size in a range of 1 to 50 nm thick.

2. The fuel cell of claim 1, further comprising:
    d. an anode-side current collector.

3. The fuel cell of claim 2, wherein the layer ordering is a), d), b), c).

4. The fuel cell of claim 2, wherein the layer ordering is d), a), b) ,c).

5. The fuel cell of claim 2, wherein the anode-side current collector is a chemical barrier, wherein the current collector is disposed to prevent transmission of $CO_2$.

6. The fuel cell of claim 2, wherein the current collector material is Pt, Pd, Pd and Pd alloys, mixed conduting bronzes or $RuO_2$.

7. The fuel cell of claim 1, wherein the at least one Pt layer is proximate the anode.

8. The fuel cell of claim 1, wherein the at least one Pt layer is proximate the cathode.

9. The fuel cell of claim 1, wherein the anode comprises RuO2.

10. The fuel cell of claim 1, wherein the anode is a chemical barrier, preventing transmission of $CO_2$.

11. The fuel cell of claim 10, wherein the chemical barrier anode comprises Pt, Ru, and their alloys.

12. The fuel cell of claim 1, wherein the cathode material is NiOOH, LSCFO, or Pt with Ru.

13. A direct methanol fuel cell comprising:
    an anode, the anode comprising a mixed-electronic-proton conducting anode material exposed to a hydrogen-containing fuel source, the anode comprising Pd or a Pd-alloy;
    a nonporous proton conducting solid Y-doped BaZrO3 electrolyte; and
    a cathode exposed to an oxygen-containing source, wherein the anode is a chemical barrier preventing transmission of $CO_2$, wherein the anode surface faces away from the electrolyte, the cathode surface faces away from the electrolyte and each surface of the electrolyte comprises Pt islands, wherein said Pt islands are spaced apart from one another, wherein each of the Pt island has a size in a range of 1 to 50 nm thick.

14. The fuel cell of claim 13, wherein the cathode material is NiOOH, LSCFO, or Pt with Ru.

* * * * *